March 18, 1952 — E. T. LORIG — 2,589,411
CONTINUOUS STRAND HELICAL CONVEYING APPARATUS
Filed April 5, 1949 — 2 SHEETS—SHEET 1

INVENTOR.
EDWIN T. LORIG
BY Donald G. Dalton
ATTORNEY

March 18, 1952   E. T. LORIG   2,589,411
CONTINUOUS STRAND HELICAL CONVEYING APPARATUS
Filed April 5, 1949   2 SHEETS—SHEET 2
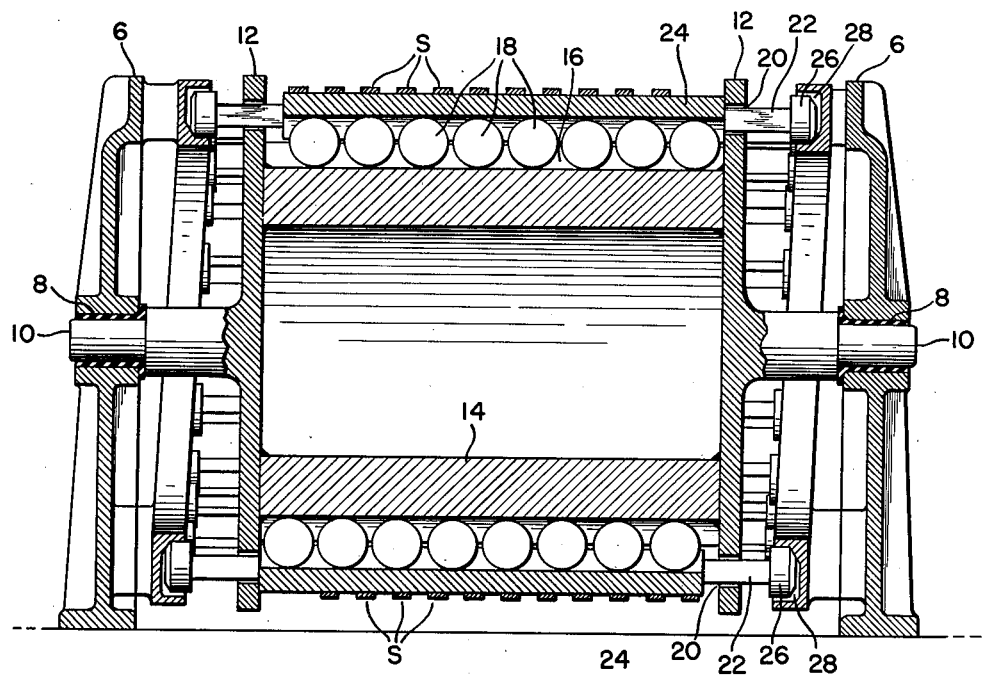
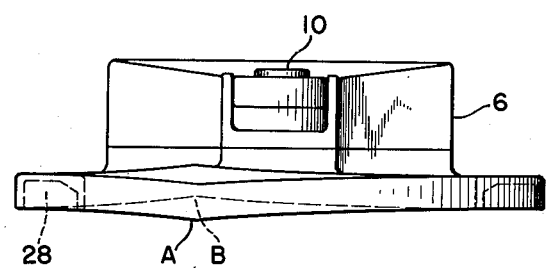
INVENTOR.
EDWIN T. LORIG
BY Donald G. Dalton
ATTORNEY Patented Mar. 18, 1952

2,589,411

UNITED STATES PATENT OFFICE 2,589,411

CONTINUOUS STRAND HELICAL CONVEYING APPARATUS

Edwin T. Lorig, Ross Township, Allegheny County, Pa., assignor to United States Steel Company, a corporation of New Jersey Application April 5, 1949, Serial No. 85,699

7 Claims. (Cl. 28—71.5)

This invention relates to a continuous strand helical conveying apparatus and more particularly to such apparatus for handling flat strip products. In the processing of flat strips in coil form, the processing equipment, such as continuous annealing furnaces, picklers, paint and enamel driers, must be extremely long if it is desired to process the strip rapidly. Since sufficient space is often not available for the equipment necessary to process the strip rapidly, the processing has been carried out at a much slower rate than desired. In order to decrease the amount of space now necessary, I have devised a helical conveyor or reel which in combination with an auxiliary reel or roll will permit leading a single continuous strand of strip onto the rotating reel body in the same relative constant position at all times without lateral deviation. In other words, each increment of strand width initially contacting the reel or deposited thereon, will do so at a point in a constant rotating plane perpendicular to the axis of the rotating reel.

It is therefore an object of my invention to provide a helical conveying apparatus which will permit each helical convolution of the strip to be equally spaced across the body of the reel with a uniform distance between strand convolutions and in which there will be no slippage between the strip and the reel body.

This and other objects will be more apparent after referring to the following specification and attached drawings, in which:

Figure 3 is a sectional view taken on the line III—III of Figure 2; and

Figure 4 is a top plan view showing the cam track.

Figure 1:
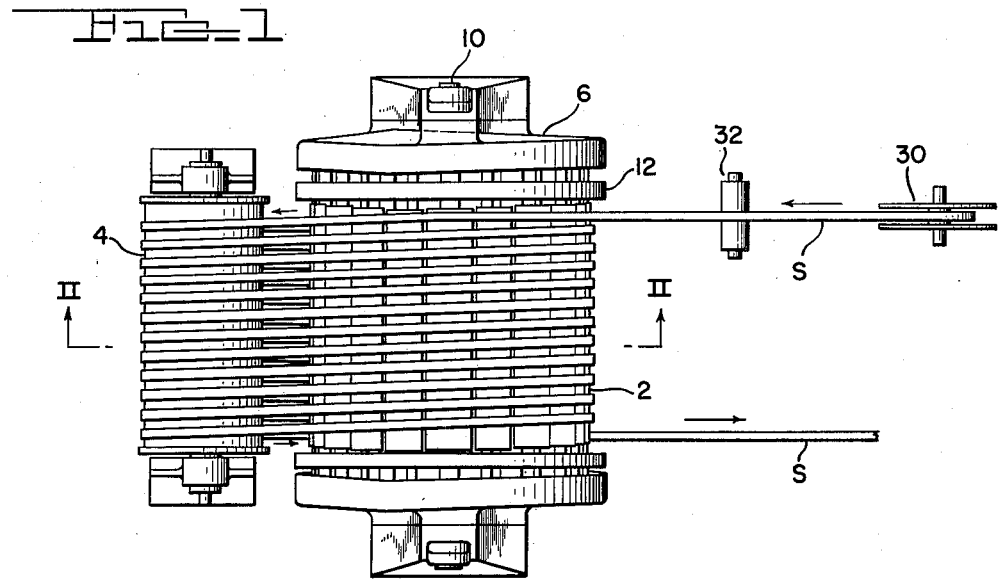
Figure 1 is a top plan view of my device.

Referring more particularly to the drawings the reference numeral 2 indicates a rotatable reel. A rotatable roll 4 is spaced from the reel 2 and has its axis substantially parallel to that of reel 2. As best shown in Figure 3, the reel 2 has a housing 6 at each end thereof. Each housing is provided with a bearing 8 for receiving a shaft 10. Mounted on each of the shafts 10 for movement therewith is a circular side plate 12. Extending between the plates 12 is a reel body 14 which is provided with a plurality of spaced apart grooves 16 around its periphery and extending the length thereof. Mounted in each of the grooves 16 is a plurality of rollers 18. Each of the plates 12 is provided with a plurality of holes 20 around its periphery for receiving the reduced end portion 22 of non-rotatable spline segments 24 which form the outer periphery of reel 2. Each of the segments 24 is provided with a groove which communicates with one of the grooves 16 for receiving one of the rollers 18. Sufficient clearance is provided between the spline segments to enable them to slide axially with respect to one another. Each of the reduced end portions 22 is provided with a roller 26 which is received in a helical cam groove 28 in the housing 6. The cam grooves 28 in the right and left-hand housing 6 are complementary and are shaped to move the segment 24 axially as the reel rotates. The cam grooves 28 can be mounted directly on the housing 6 or in a separate member secured to the housing 6 as shown. The end portions 22 are made separate from the main portion of the spline segments 24 to provide for assembly. Each of the cam grooves 28 is circular with the axis thereof coinciding with the axis of rotation of shafts 10. Between points A and B the cam groove is inclined from a transverse plane in a direction to cause the splines to move rapidly in one direction. Between points B and A the cam groove is inclined in the opposite direction so that the splines are returned gradually and uniformly to their original position. The strip S to be processed passes to the reel 2 from an uncoiler 30 over the roll 32.

Figure 2:
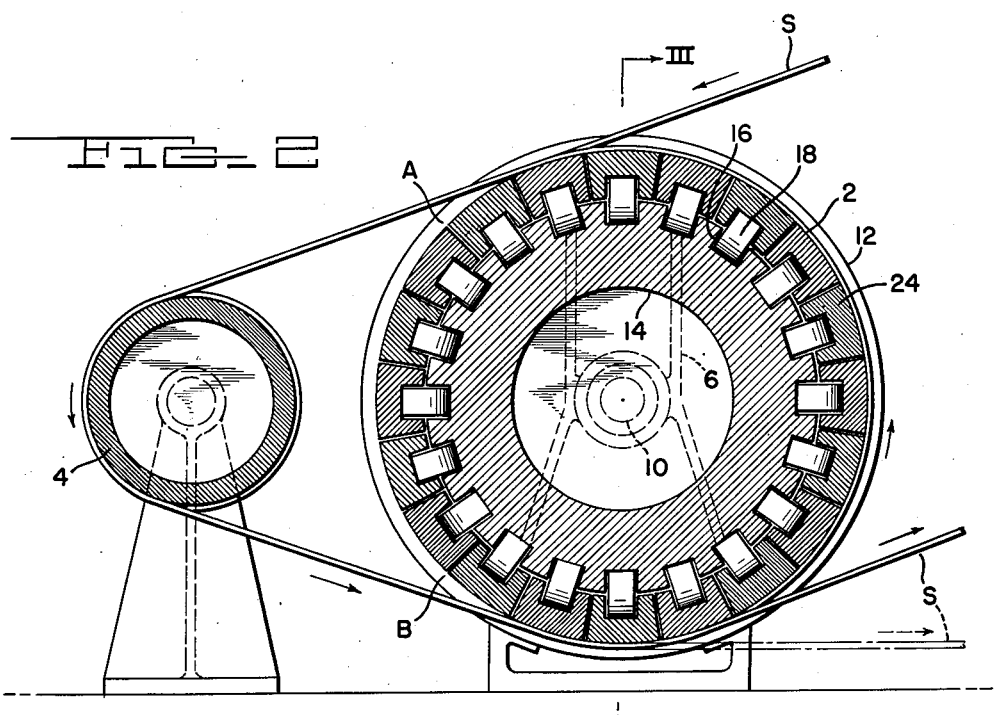
Figure 2 is an enlarged sectional view taken on the line II—II of Figure 1.

The operation of the device is as follows:

The strip S to be conveyed helically across the face of the reel is fed from the uncoiler 30 over the roll 32 at one end of the reel 2. To avoid the tendency for edge crinkling or overstressing of the edge of the workpiece the strand S should be fed onto and off the reel 2 at a slight angle equal to the pitch of the actuating helical cams 28. This is accomplished by tilting the roll 32 the desired amount. The strip S passes around a portion of the reel 2 and then around the roll 4 and back to the reel 2. The strip then passes around the portion of the reel from points B to A as shown in Figure 2 and the end thereof is clamped loosely to the oncoming strip to form a complete circle. Sufficient back tension is applied to the entering strip to tighten up the circular band to provide friction between the band and the reel body. The reel is then rotated either manually or mechanically and the strip S is moved gradually across the width of the reel while it is in contact therewith. This is done by movement of the splines 24 which is caused by the rollers 26 riding in the cam groove 28. Between points A and B the strip S is not in contact with the splines and the splines are moved in the reverse direction. Since the spline segments between points B and A are moving laterally in unison the same amount per degree of rotation there is no lateral movement between the spline segments and therefore no movement of the strand relative to the spline surfaces. In other words, the cam track between points B and A is helically formed at its base with the angle between the base and a plane perpendicular to the axis of reel rotation being the same at all points. The strip S can be removed from the reel 2 at any point.

The rollers 18 are only necessary when using high tension on the strip. If desired, the rollers can be replaced by balls, these serving in the same manner to reduce the friction. The rollers or balls also serve as guides to prevent side pressure between the splines. For reels used with light strip in which the tension is low the rollers can be dispensed with and the load carried by means of the cam rollers in the cam track.

A reel similar to reel 2 may be used in place of the roll 4. This is particularly desirable when helically conveying relatively wide strip. In such a case the device would operate in substantially the same way and it is to be understood that a rotatable roll as used in the claims refers to both a plain surfaced roll as shown or a reel similar to reel 2.

While one embodiment of my invention has been shown and described it will be apparent that other adaptations and modifications may be made without departing from the scope of the following claims.

I claim:

1. Continuous strand helical conveying apparatus comprising a rotatable reel and a rotatable roll spaced therefrom with its axis substantially parallel to the axis of the reel, said rotatable reel having a housing at each end thereof, a roll body extending between and rotatably mounted in said housings, a plurality of closely spaced non-rotatable splines arranged around the periphery of said body to form a substantially continuous ring surface, each of said housings having a helically formed cam groove therein facing the opposite housing, the ends of said splines extending into said cam grooves, the bottom of said cam grooves adjacent said roll being arranged at an angle with a plane perpendicular to the axis of the reel to move the splines axially in one direction, and the major portion of said cam grooves having the bottom thereof arranged at an oppositely extending helix to move the splines axially an equal amount per degree of reel revolution in the opposite direction.

2. Continuous strand helical conveying apparatus comprising a rotatable reel and a rotatable roll spaced therefrom with its axis substantially parallel to the axis of the reel, said rotatable reel having a housing at each end thereof, a roll body extending between and rotatably mounted in said housings, a plurality of non-rotatable splines arranged around the periphery of said body, each of said housings having a helically formed cam groove therein facing the opposite housing, a cam roller mounted on each end of each spline and extending into the cam groove, the bottom of said cam grooves adjacent said roll being arranged at an angle with a plane perpendicular to the axis of the reel to move the splines axially in one direction, the major portion of said cam grooves having the bottom thereof arranged at an oppositely extending helix to move the splines axially an equal amount per degree of reel revolution in the opposite direction, said body having a plurality of axially extending grooves therein around its periphery, each of said splines having a groove therein communicating with one of the grooves in said body, and anti-friction means in the cooperating grooves extending therebetween.

3. Continuous strand helical conveying apparatus comprising a rotatable reel and a rotatable roll spaced therefrom with its axis substantially parallel to the axis of the reel, said rotatable reel having a housing at each end thereof, a side plate rotatably mounted in each housing, a body extending between and attached to said side plates, a plurality of closely spaced non-rotatable splines arranged around the periphery of said body to form a substantially continuous ring surface, each of said housings having a helically formed cam groove therein facing the opposite housing, a cam roller mounted on each end of each spline and extending into the cam groove, the bottom of said cam grooves adjacent said roll being arranged at an angle with a plane perpendicular to the axis of the reel to move the splines axially in one direction, and the major portion of said cam grooves having the bottom thereof arranged at an oppositely extending helix to move the splines axially an equal amount per degree of reel revolution in the opposite direction.

4. Continuous strand helical conveying apparatus comprising a rotatable reel and a rotatable roll spaced therefrom with its axis substantially parallel to the axis of the reel, said rotatable reel having a housing at each end thereof, a side plate rotatably mounted in each housing, a body extending between and attached to said side plates, a plurality of non-rotatable splines arranged around the periphery of said body, each of said housings having a helically formed cam groove therein facing the opposite housing, a cam roller mounted on each end of each spline and extending into the cam groove, the bottom of said cam grooves adjacent said roll being arranged at an angle with a plane perpendicular to the axis of the reel to move the splines axially in one direction, the major portion of said cam grooves having the bottom thereof arranged at an oppositely extending helix to move the splines axially an equal amount per degree of reel revolution in the opposite direction, said body having a plurality of axially extending grooves therein around its periphery, each of said splines having a groove therein communicating with one of the grooves in said body, and anti-friction means in the cooperating grooves extending therebetween.

5. Continuous strand helical conveying apparatus comprising a rotatable reel and a rotatable roll spaced therefrom with its axis substantially parallel to the axis of the reel, said rotatable reel having a housing at each end thereof, a side plate rotatably mounted in each housing, a body extending between and attached to said side plates, a plurality of closely spaced non-rotatable splines arranged around the periphery of said body to form a substantially continuous ring surface, said plates having openings therein aligned with said splines, said splines having reduced end portions extending through said openings, each of said housings having a helically formed cam groove therein facing the opposite housing, a cam roller mounted on each end of each spline and extending into the cam groove, the bottom of said cam grooves adjacent said roll being arranged at an angle with a plane perpendicular to the axis of the reel to move the splines axially in one direction, and the major portion of said cam grooves having the bottom thereof arranged at an oppositely extending helix to move the splines axially an equal amount per degree of reel revolution in the opposite direction.

6. Continuous strand helical conveying apparatus comprising a rotatable reel and a rotatable roll spaced therefrom with its axis substantially parallel to the axis of the reel, said rotatable reel having a housing at each end thereof, a side plate rotatably mounted in each housing, a body extending between and attached to said side plates, a plurality of non-rotatable splines arranged around the periphery of said body, said plates having openings therein aligned with said splines, said splines having reduced end portions extending through said openings, each of said housings having a helically formed cam groove therein facing the opposite housing, a cam roller mounted on each end of each spline and extending into the cam groove, the bottom of said cam grooves adjacent said roll being arranged at an angle with a plane perpendicular to the axis of the reel to move the splines axially in one direction, the major portion of said cam grooves having the bottom thereof arranged at an oppositely extending helix to move the splines axially an equal amount per degree of reel revolution in the opposite direction, said body having a plurality of axially extending grooves therein around its periphery, each of said splines having a groove therein communicating with one of the grooves in said body and antifriction means in the cooperating grooves and extending therebetween.

7. Continuous strand helical conveying apparatus comprising a rotatable reel and a rotatable roll spaced therefrom with its axis substantially parallel to the axis of the reel, said rotatable reel having a housing at each end thereof, a roll body extending between and rotatably mounted in said housings, a plurality of closely spaced non-rotatable splines arranged around the periphery of said body to form a substantially continuous ring surface, means for moving the splines axially in one direction during the time they are adjacent the roll, and means for moving the splines axially an equal amount per degree of reel revolution in the opposite direction during the rest of their travel.

EDWIN T. LORIG.

REFERENCES CITED

The following references are of record in the file of this patent:

UNITED STATES PATENTS

| Number | Name | Date |
|---|---|---|
| 1,960,743 | Junkers | May 29, 1934 |
| 2,175,218 | Samerdyke | Oct. 10, 1939 |
| 2,411,889 | McDermott | Dec. 3, 1946 |
| 2,444,315 | Sever | June 29, 1948 |

FOREIGN PATENTS

| Number | Country | Date |
|---|---|---|
| 145,992 | Germany | Nov. 25, 1903 |